US005826417A

United States Patent [19]

Evans

[11] Patent Number: 5,826,417

[45] Date of Patent: Oct. 27, 1998

[54] OPERATOR CONTROLLED DEFLECTOR PLATE FOR DISCHARGE CHUTE OF RIDING LAWN MOWER

[75] Inventor: Arthur Leon Evans, Coatesville, Ind.

[73] Assignee: Magic Circle Corporation, Coatesville, Ind.

[21] Appl. No.: 789,104

[22] Filed: Dec. 23, 1996

[51] Int. Cl.[6] .................... A01D 75/20

[52] U.S. Cl. .................... 56/320.2; 56/17.4; 56/DIG. 24

[58] Field of Search .................... 56/320.2, 320.1, 56/17.4, 1, DIG. 20, DIG. 24

[56] References Cited

U.S. PATENT DOCUMENTS

| | | | |
|---|---|---|---|
| 4,135,351 | 1/1979 | Akgulian | 56/320.2 X |
| 4,445,312 | 5/1984 | Cartner | 56/17.4 X |
| 5,040,364 | 8/1991 | Deegan | 56/320.2 |
| 5,048,279 | 9/1991 | Badawey et al. | 56/17.4 X |
| 5,133,175 | 7/1992 | Dumbeell | 56/17.4 |
| 5,284,007 | 2/1994 | Poe et al. | 56/17.4 X |
| 5,657,620 | 8/1997 | Thagard et al. | 56/DIG. 24 X |

*Primary Examiner*—Terry Lee Melius
*Attorney, Agent, or Firm*—Jack Schuman

[57] ABSTRACT

The exit end of the discharge chute of a riding lawn mower having rotating grass-cutting blades is provided with a rotatable deflector plate, the position of which is controlled through a linkage by the operator of the lawn mower while seated and without stopping the lawn mower. The operator, through the linkage, can shift the deflector plate between an operative position closing the exit end of the discharge chute, an inoperative position opening the said exit end, and positions therebetween. The deflector plate is provided with apertures of size and spacing sufficient to prevent the passage therethrough of stones large enough to cause physical injury to persons or damage to property in the vicinity of the exit end, while permitting the passage therethrough of grass cuttings, small stones having no potential to cause such physical injury or property damage, and air forced through the discharge chute by action of the grass-cutting blades.

1 Claim, 2 Drawing Sheets

OPERATOR CONTROLLED DEFLECTOR PLATE FOR DISCHARGE CHUTE OF RIDING LAWN MOWER

BACKGROUND OF THE INVENTION

1. Field of the Invention

This invention relates, broadly speaking, to a safety device for the discharge chute of a riding lawn mower having one or more rotating grass-cutting blades.

More particularly, this invention relates to a deflector plate for the discharge chute of a riding lawn mower having one or more rotating grass-cutting blades, together with means accessible to the operator of the lawn mower. while seated on and operating the lawn mower, to shift the deflector plate between an operative or partially constricting position at the exit end of the discharge chute or, selectively, to an inoperative or non-constricting open position at the exit end of the discharge chute, or to intermediate positions.

Even more particularly, this invention relates to an improved deflector plate which, when in operative position at the exit end of the discharge chute, permits a lower drain on the power plant of the lawn mower than would result with a conventional deflector plate.

2. Description of the Prior Art

Riding lawn mowers having rotating grass-cutting blades conventionally are provided with discharge chutes through which grass cuttings are flung. Because the rotating blades sometimes pick up stones and the like which, when forceably ejected from the discharge chutes, could strike and cause physical harm to people in the vicinity of the exit end of the discharge chutes or could damage structures (i.e., glass windows) in the vicinity of the exit end of the discharge chutes, these discharge chutes conventionally are provided at their exit ends with deflector plates which direct grass cuttings and stones downwardly and away from a potentially dangerous trajectory.

Mowing very large areas of grass, for example several acres in size, frequently is a commercial operation. It would be most desirable, from the viewpoint of a commercial grass cutter who wants to be competitive and also to maintain profitability to be able to achieve very fast cutting rates, for example approximately four acres of grass per hour of operation.

A deflector plate in operative position at the exit end of a discharge chute to deflect downwardly grass cuttings and stones in effect constricts the said exit end. This constriction results in an increased load on the cutting blades and a drain on the engine driving the lawn mower. This increased load slows down the cutting rate of the lawn mower and decreases the quality of the cut. Conventionally, the deflector plate is always held in operative position to constrict the exit end of the discharge chute.

In cutting very large areas of grass, most often there are no people or structures in the vicinity of the exit end of the discharge chute in most passes of the lawn mower over the area to be cut. Consequently, in most of these passes, there is no potential for personal injury or property damage due to stones being flung out of the discharge chute.

It would be most advantageous to enable the operator of the riding lawn mower to use the lawn mower more efficiently and to achieve a high cutting rate of good quality. and yet to prevent personal injury or property damage when the lawn mower is making a cutting pass in which people and structures are in the vicinity of the exit end of the discharge chute. Thus, it would be most advantageous if the operator of the lawn mower were able to selectively open or close the deflector plate while seated on the mower and without interfering with the movement of the mower (i.e., without having to stop the lawn mower and dismount each time the position of the deflector plate is changed from open or inoperative position to closed or operative position).

Moreover, it would be advantageous if the deflector plate were designed to deflect downwardly, when in operative position, those stones of size large enough to cause personal injury or property damage, and to permit the passage therethrough of grass cuttings, small stones having no potential for causing personal injury or property damage, and air forced through the discharge chute through action of the rotating cutting blades.

SUMMARY OF THE INVENTION

One of the objects of this invention is to provide an improved safety device for the exit end of the discharge chute of a riding lawn mower having one or more grass cutting blades.

Another of the objects of this invention is to provide an improved deflector plate and linkage means permitting the operator of a riding lawn mower, while seated on the lawn mower and without having to dismount, to shift the deflector plate between an operative position partially constricting the exit end of the discharge chute or, selectively, to a non-constricting, non-operative or open position, or to intermediate positions.

Yet another object of this invention is to provide an improved deflector plate which, when in operative or partially constricting position at the exit end of the discharge chute, deflects downwardly those stones large enough to cause physical injury or property damage and permits the passage therethrough of grass, small stones having no potential for causing personal injury or property damage, and air forced through the discharge chute through the action of the rotating cutting blades.

Still other and further objects of this invention will become apparent by reference to the accompanying specification and drawings, and to the appended claims.

DESCRIPTION OF THE DRAWINGS

Referring now to the drawings, in which like numerals represent like parts in the several views.

DESCRIPTION OF THE PREFERRED EMBODIMENT

A riding lawn mower (not shown), having one or more rotating grass-cutting blades, is conventionally provided with discharge chute 1 having exit end 2 from which are discharged grass cuttings and debris including stones picked up during the course of the grass cutting operation.

Figure 2:
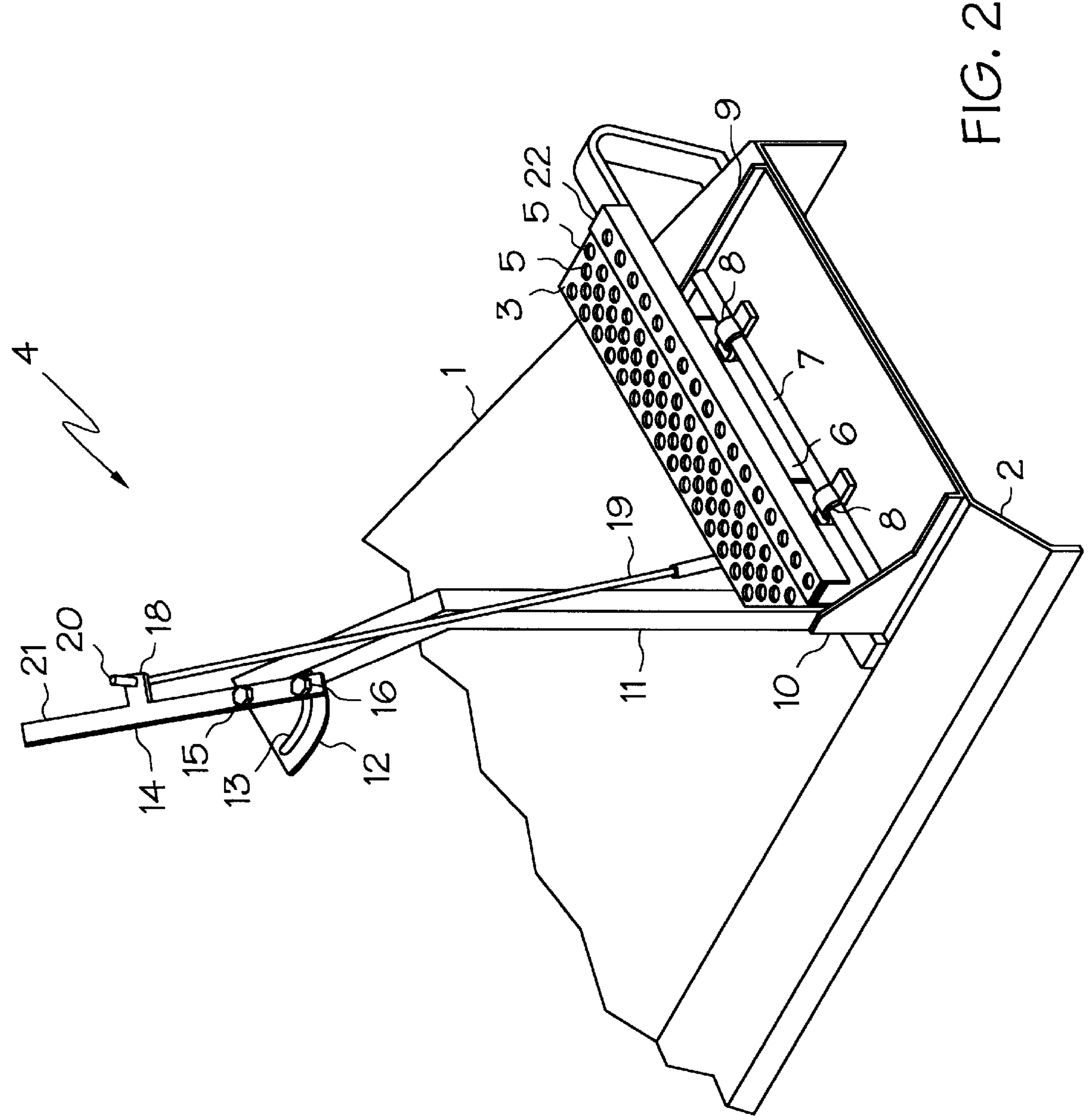
FIG. 2 represents a view in perspective, partially diagrammatic, showing the deflector plate of FIG. 1 in open or non-operative position.

Discharge chute 1 is open at the bottom, as clearly shown in FIG. 2.

The present invention comprises deflector plate 3 and control means 4 for closing or selectively opening deflector plate 3 about exit end 2 of discharge chute 1. Deflector plate 3 is seen as having a plurality of spaced apertures 5 therethrough, and is secured to plate 6.

Shaft 7, extending through collars 8 in rotatable engagement therewith, is secured at its two ends to members 9 and 10 which, in turn, are secured to the top of discharge chute 1.

Collars 8 are secured to plate 6.

Figure 1:
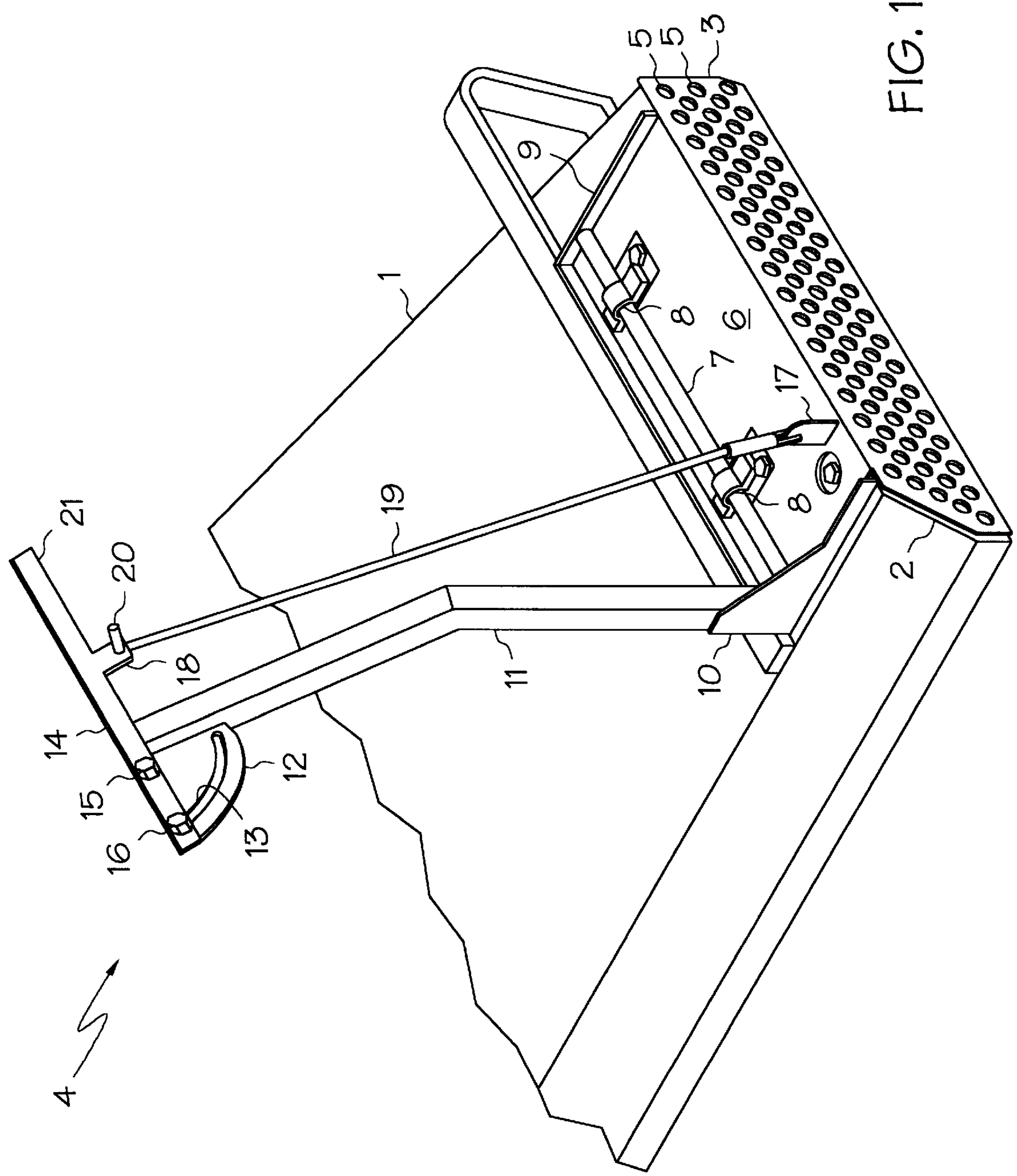
FIG. 1 represents a view in perspective, partially diagrammatic, of the deflector plate in closed or operative position at the exit end of the discharge chute of a riding lawn mower.

It will be seen that, in the foregoing manner, plate 6, carrying deflector plate 3 secured thereto, may be rotated about shaft 7, thereby shifting deflector plate 3 between a closed or operative position with respect to exit end 2 of discharge chute 1 as shown in FIG. 1, and an open or non-operative position with respect to said exit end 2 as shown in FIG. 2, or to intermediate positions.

Post 11 is secured at its lower end to member 10, and extends upwardly therefrom to a location within convenient reach of the operator of the lawn mower while seated thereon.

Plate 12 is secured to the upper end of post 11, and is provided with arcuate opening 13 therethrough. Operating lever 14 is pivotally mounted to plate 12, by means of bolt 15, and is further provided with bolt 16 riding in arcuate opening 13. It will be noted that, in geometric terms, arcuate opening 13 lies on the circumference of a circle whose center is the longitudinal axis of bolt 15.

Plate 6 is provided with tab 17. Operating lever 14 is provided with extension 18. Shaft 19 is pivotably secured at its lower end to tab 17, and is provided with a right-angle bend 20 at its upper end extending through an aperture in extension 18. Thus, operating lever 14 is linked to plate 6, and through plate 6 to deflector plate 3.

It will be seen that the operator of the lawn mower, can, while seated on the mower, conveniently grasp operating lever 14 at that end 21 thereof generally adjacent extension 18 and, by pivoting operating lever 14 about bolt 15. rotate plate 6 about shaft 7 in one direction to close deflector plate 3 to operative position at exit end 2 of discharge chute 3 or, selectively, in the opposite direction to raise deflector plate 3 to open or non-operative position with respect to said exit 2, or to intermediate positions.

In operation, the operator of the lawn mower, while seated on the lawn mower and without stopping the lawn mower, will grasp and rotate operating lever 14 about bolt 15 to lower or close deflector plate 3 at exit end 2 of discharge chute 1 when making a cutting pass on the grassy area being mowed when the trajectory of the discharge from said exit end 2, if not deflected downwardly, could cause physical injury to persons or damage to property within said trajectory. Apertures 5 in deflector plate 3 are so sized and spaced as to prevent the passage there-through of stones large enough to cause such physical injury or property damage, while permitting the essentially unrestricted passage therethrough of grass cuttings and air forced through the discharge chute 1 by action of the rotating cutting blades.

This configuration of deflector plate 3 with apertures 5 therethrough reduces increased load on the grass-cutting blades and the engine driving the lawn mower which otherwise would result with a conventional unperforated deflector plate in closed or operative position at exit end 2 of discharge chute 1, and also permits a higher quality cut of grass.

Material deflected by deflector plate 3 drops through the opening in the bottom of discharge chute 1.

When a cutting pass on the grassy area being mowed is made where there are no people and no property within the trajectory of the discharge from the exit end 2 of discharge chute 1, there would be no need to constrict, even partially, the said exit end 2. The operator, while seated on the lawn mower and without stopping the lawn mower, will grasp and rotate operating lever 14 about bolt 15 to raise deflector plate 3 from exit end 2, thereby removing all constriction, however small, from the said exit end 2.

Under some operating conditions, it may be advantageous to place deflector plate 3 in a position intermediate fully open and fully closed.

As shown in FIG. 2, deflector plate 3 is provided with member 22 extending along the length thereof. Member 22 serves to facilitate the mulching of leaves when deflector plate 3 is in closed or operative position at exit end 2.

The invention, described herein in some detail, permits the lawn mower to be operated at maximum speed and efficiency consistent with safety, producing a higher quality of cut.

A lawn mower equipped with the present invention will outperform conventionally equipped lawn mowers of equal horsepower.

Since modification and changes which do not depart from the spirit of the invention as disclosed herein may readily occur to those skilled in the art to which this invention pertains, the appended claims should be construed as covering all suitable modifications and equivalents.

What is claimed is:

1. A safety device for a riding lawn mower having rotating grass-cutting blades, a seat thereon for the operator of the lawn mower, and a discharge chute having an exit end, said safety device comprising:

(a) a deflector plate, (b) first means rotatably mounting said deflector plate to said discharge chute adjacent the exit end thereof, (c) control means operable by the operator of the lawn mower while seated thereon, said control means comprising:

(i) a post having a first end and a second end, (ii) said first end of said post being secured to said discharge chute, (iii) said second end of said post extending upwardly from said first end, (iv) an operating lever pivotally mounted to said post adjacent the second end thereof, and having a free end, (v) linkage means having a first end and a second end, (vi) the first end of said linkage means being pivotally connected to said first means, (vii) the second end of said linkage means being pivotally connected to said operating lever, (viii) the free end of said operating lever being positioned adjacent the operator of said lawn mower, (d) whereby the operator of the lawn mower can, while seated on said lawn mower and without stopping said lawn mower, grasp the free end of said operating lever and pivot said operating lever in one direction to rotate said deflector plate to operative position closing the exit end of said discharge chute or, selectively, in the opposite direction to rotate said deflector plate to inoperative position opening said exit end or, selectively, to a position between operative and inoperative position.

* * * * *